United States Patent
Jiang et al.

(10) Patent No.: US 11,734,521 B2
(45) Date of Patent: Aug. 22, 2023

(54) METHOD, DEVICE AND STORAGE MEDIUM FOR TRAINING BIDIRECTIONAL MACHINE TRANSLATION MODEL USING SUM OF FORWARD AND REVERSE TRANSLATION SIMILARITIES

(71) Applicant: BEIJING XIAOMI MOBILE SOFTWARE CO., LTD., Beijing (CN)

(72) Inventors: Jialiang Jiang, Beijing (CN); Xiang Li, Beijing (CN); Jianwei Cui, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 151 days.

(21) Appl. No.: 16/870,632

(22) Filed: May 8, 2020

(65) Prior Publication Data
US 2021/0174019 A1 Jun. 10, 2021

(30) Foreign Application Priority Data
Dec. 10, 2019 (CN) .......................... 201911259415.X

(51) Int. Cl.
*G06F 40/263* (2020.01)
*G06N 3/08* (2023.01)
(Continued)

(52) U.S. Cl.
CPC ............ *G06F 40/44* (2020.01); *G06F 18/214* (2023.01); *G06F 40/263* (2020.01); *G06N 3/08* (2013.01)

(58) Field of Classification Search
CPC ........ G06F 40/263; G06F 40/20; G06F 40/40; G06F 40/42; G06F 40/44; G06F 16/3331;
(Continued)

(56) References Cited

U.S. PATENT DOCUMENTS

2009/0083023 A1* 3/2009 Foster ..................... G06F 40/45
704/3
2016/0350290 A1* 12/2016 Fujiwara ................. G06F 40/51
(Continued)

FOREIGN PATENT DOCUMENTS

CN 106156010 A 11/2016
CN 107423290 A 12/2017
(Continued)

OTHER PUBLICATIONS

"Expanding Korean/English Parallel Corpora using Back-translation for Neural Machine Translation", Guanghao Xu, Youngjoong Ko, Jungyun Seo, Sogang University, Dong-a University, Oct. 12, 2018.

(Continued)

*Primary Examiner* — Farzad Kazeminezhad
(74) *Attorney, Agent, or Firm* — Syncoda LLC; Feng Ma

(57) ABSTRACT

A method includes: a bidirectional translation model to be trained and training data are acquired, the training data including a source corpus and a target corpus corresponding to the source corpus; the bidirectional translation model is trained for N cycles, each cycle of training including a forward translation process of translating the source corpus into a pseudo target corpus and a reverse translation process of translating the pseudo target corpus into a pseudo source corpus and N being a positive integer greater than 1; a forward translation similarity and a reverse translation similarity are acquired; and when a sum of the forward translation similarity and the reverse translation similarity converges, it is determined that training of the bidirectional translation model is completed, where the training completed bidirectional translation model is used to perform translating.

15 Claims, 5 Drawing Sheets

(51) Int. Cl.
*G06F 40/51* (2020.01)
*G06F 40/58* (2020.01)
*G06N 3/02* (2006.01)
*G10L 15/26* (2006.01)
*G06F 40/44* (2020.01)
*G06F 18/214* (2023.01)

(58) Field of Classification Search
CPC ....... G06F 40/47; G06F 40/51; G06K 9/6256; G06K 9/6217; G06N 3/08; G06N 3/0445; G06N 3/0454; G06N 20/00
USPC ...... 704/1–10, 202, 231–232, 235, 270, 277
See application file for complete search history.

(56) References Cited

U.S. PATENT DOCUMENTS

| | | | |
|---|---|---|---|
| 2017/0212890 A1 | 7/2017 | Akbik et al. | |
| 2019/0155909 A1 | 5/2019 | Na | |
| 2020/0117715 A1* | 4/2020 | Lee | G06N 3/088 |
| 2021/0390674 A1* | 12/2021 | Afrasiabi | G06T 7/97 |

FOREIGN PATENT DOCUMENTS

| | | | |
|---|---|---|---|
| CN | 107870902 | A | 4/2018 |
| CN | 109062907 | A | 12/2018 |
| CN | 109558605 | A | 4/2019 |
| CN | 109858042 | A | 6/2019 |
| CN | 109948166 | A | 6/2019 |
| CN | 110069790 | A | 7/2019 |
| CN | 110334361 | A | 10/2019 |
| EP | 3489841 | A1 | 5/2019 |
| JP | 201622483 | A | 12/2016 |
| JP | 2019121241 | A | 7/2019 |
| JP | 2019153023 | A | 9/2019 |

OTHER PUBLICATIONS

Creation of the high quality large-scale false bilingual corpus by a binary name besides Imankulova Aizhan, and reverse translation, 23rd time of language-processing society annual meeting Announcement collected papers [online], Japan, a language-processing society, Mar. 6, 2017, 210-213-page.

Imamura Kenji, Introduction of the single language corpus to the neural machine translation by one person and false text generation, 23rd time of other society [language-processing] annual meeting Announcement collected papers [online], Japan, a language-processing society, Mar. 6, 2017, 1026-1029 pages.

First Office Action of the Korean application No. 10-2020-0046002, dated May 28, 2021.

Notice of Allowance of the Japanese application No. 2020-087105, dated Jul. 13, 2021.

Park Hancheol et al. "Addressing Low Resource Problems in Statistical Machine Translation of Sign Language", Korean Institute of Information Scientists and Engineers, Jun. 2016.

Notice of Allowance of the Korean application No. 10-2020-0046002, dated Nov. 25, 2021.

Categorical Reparameterization with Gumbel-Softmax (Eric Jang, Shixiang Gu, Ben Poole), arXiv:1611.01144v5 [stat.ML] Aug. 5, 2017.

Xing Niu et al: "Bi-Directional Differentiable Input Reconstruction for Low-Resource Neural Machine Translation", arxiv. org, Cornell University Library,201 Olin Library Cornell University Ithaca, NY14853, Nov. 2, 2018(Nov. 2, 2018), XP081199323, * the whole document *.

Zhaopeng Tu et al: "Neural Machine Translation with Reconstruction", Nov. 6, 2016(Nov. 6, 2016), XP055628790, Retrieved from the Internet: URL: https://arxiv.org/pdf/1611.01874.pdf * the whole document *.

Yingce Xia et al: "Dual Learning for Machine Translation", arxiv. org, Cornell University Library,201 Olin Library Cornell University Ithaca, NY 14853, Nov. 1, 2016(Nov. 1, 2016), XP080728584, * sections 1-3*.

Yuhui Sun et al: "Xiaomi's Submissions for IWSLT 2020 Open Domain Translation Task", Proceedings of the 17th International Conference on Spoken Language Translation (IWSLT), Jul. 20, 2020 (Jul. 20, 2020), pp. 149-157, XP055731612, DOI: 10.18653/v1/P17 * the whole document *.

Supplementary European Search Report in the European application No. 20176557.5, dated Sep. 28, 2020.

Wang Kun, Yin Mingming, AL. "The Study on Low-Resource Uygur-Chinese Neural Machine Translation", Journal of Jiangxi Normal University( Natural Science), vol. 43 No. 6, Nov. 2019.

Lijun Wu, Yiren Wang, AL. "Exploiting Monolingual Data at Scale for Neural Machine Translation", Proceedings of the 2019 Conference on Empirical Methods in Natural Language Processing and the 9th International Joint Conference on Natural Language Processing, Publisher: Association for Computational Linguistics, Nov. 2019, pp. 4207-4216. URL: https://aclanthology.org/D19-1430.

* cited by examiner

METHOD, DEVICE AND STORAGE MEDIUM FOR TRAINING BIDIRECTIONAL MACHINE TRANSLATION MODEL USING SUM OF FORWARD AND REVERSE TRANSLATION SIMILARITIES

CROSS-REFERENCE TO RELATED APPLICATION

This application claims priority to Chinese patent application No. 201911259415.X filed on Dec. 10, 2019, the disclosure of which is hereby incorporated by reference in its entirety.

BACKGROUND

In a machine translation application, a machine translation model is required to be trained. When the machine translation model is trained, a large number of bilingual parallel corpuses are required as training data.

SUMMARY

The present disclosure relates generally to machine translation, and more specifically to a method, device and storage medium for training a machine translation model.

According to a first aspect of embodiments of the present disclosure, a method for training a machine translation model is provided, which may include that:

a bidirectional translation model to be trained and training data are acquired, the training data including a source corpus and a target corpus corresponding to the source corpus;

the bidirectional translation model is trained for N cycles, each cycle of training including a forward translation process of translating the source corpus into a pseudo target corpus and a reverse translation process of translating the pseudo target corpus into a pseudo source corpus and N being a positive integer greater than 1;

a forward translation similarity and a reverse translation similarity are acquired, the forward translation similarity being a similarity between the target corpus and the pseudo target corpus and the reverse translation similarity being a similarity between the source corpus and the pseudo source corpus; and when a sum of the forward translation similarity and the reverse translation similarity converges, it is determined that training of the bidirectional translation model is completed.

According to a second aspect of the embodiments of the present disclosure, a machine translation model training device is provided, which may include:

a processor; and a memory device configured to store instructions executable for the processor, wherein when the instructions are executed by the processor, the processor may be configured to:

acquire a bidirectional translation model to be trained and training data, the training data including a source corpus and a target corpus corresponding to the source corpus;

train the bidirectional translation model for N cycles, each cycle of training including a forward translation process of translating the source corpus into a pseudo target corpus and a reverse translation process of translating the pseudo target corpus into a pseudo source corpus and N being a positive integer greater than 1;

acquire a forward translation similarity and a reverse translation similarity, the forward translation similarity being a similarity between the target corpus and the pseudo target corpus and the reverse translation similarity being a similarity between the source corpus and the pseudo source corpus; and when a sum of the forward translation similarity and the reverse translation similarity converges, determine that training of the bidirectional translation model is completed.

According to a third aspect of the embodiments of the present disclosure, a non-transitory computer-readable storage medium is provided, instructions stored in the storage medium being executed by one or more processors of a terminal to enable the terminal to execute a method for train a machine translation model, the method including that:

a bidirectional translation model to be trained and training data are acquired, the training data including a source corpus and a target corpus corresponding to the source corpus;

the bidirectional translation model is trained for N cycles, each cycle of training including a forward translation process of translating the source corpus into a pseudo target corpus and a reverse translation process of translating the pseudo target corpus into a pseudo source corpus and N being a positive integer greater than 1;

a forward translation similarity and a reverse translation similarity are acquired, the forward translation similarity being a similarity between the target corpus and the pseudo target corpus and the reverse translation similarity being a similarity between the source corpus and the pseudo source corpus; and when a sum of the forward translation similarity and the reverse translation similarity converges, it is determined that training of the bidirectional translation model is completed.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
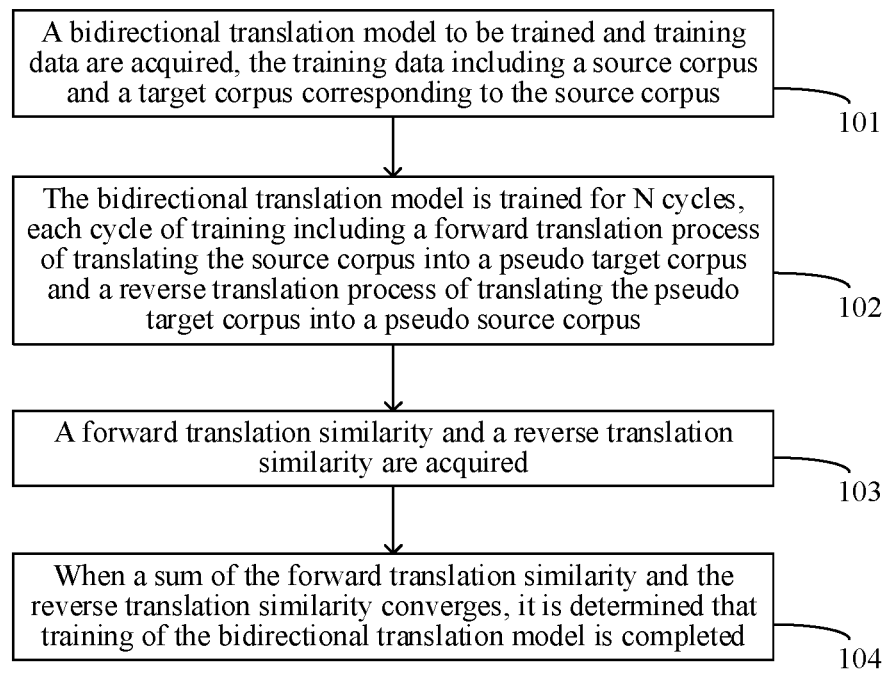
FIG. 1 is a flowchart showing a method for training a machine translation model according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

In many application scenarios, for example, a minority language related machine translation scenario, there are not so many bilingual parallel corpus resources, and lacking of training corpuses makes it difficult for a machine translation model to achieve an ideal translation effect. Mainly due to great difficulties in acquisition of bilingual parallel corpuses and high cost, there are only hundreds of thousands or even tens of thousands of parallel corpuses for many minority languages. Moreover, the number of minority languages is far larger than that of majority languages, and consequently, cost in construction of a large number of bilingual parallel corpuses for each minority language-majority language or each minority language-minority language pair is unacceptable.

A method of constructing pseudo parallel corpuses can employ a large number of monolingual corpuses based on reverse translation. That is, since difficulties in acquisition of monolingual corpuses are far lower than those in acquisition of bilingual parallel corpuses, a large number of target monolingual corpuses may be acquired, the monolingual corpuses are translated into corresponding source translations through a reverse translation model, and finally a model is trained by use of constructed pseudo corpuses. However, in this method, a reverse translation method depends on the additionally introduced reverse translation model and has a relatively high requirement on quality of the reverse translation model. Under the condition of few resources, high quality of the reverse translation model is unlikely to meet as a premise.

Various embodiments of the present disclosure can provide a method for training a machine translation model, which can be applied in circumstance of few resources.

A bidirectional translation model is taken as a machine translation model in the present disclosure. In each cycle of training, a forward translation process of translating a source corpus into a pseudo target corpus and a reverse translation process of translating the pseudo target corpus into a pseudo source corpus are implemented, and whether a sum of the forward translation similarity of the forward translation process and the reverse translation similarity of the reverse translation process converges or not is judged to determine whether training of the machine translation model is completed or not. The reverse translation process is implemented through a reconstructor.

With adoption of the method, a reverse translation corpus is introduced into training to enrich corpuses, so that a model training effect is improved under the condition of few resources. Moreover, with introduction of a bidirectional translation method, a reverse translation model is trained at the same time, so that the problem that it is difficult to acquire a high-quality reverse translation model by use of a conventional reverse translation method is solved.

The method for training a machine translation model according to some embodiments of the present disclosure will be described below in detail.

FIG. 1 is a flowchart showing a method for training a machine translation model, according to some embodiments of the present disclosure. As shown in FIG. 1, the method includes the following blocks.

In operation 101, a bidirectional translation model to be trained and training data are acquired, the training data including a source corpus and a target corpus corresponding to the source corpus.

In operation 102, the bidirectional translation model is trained for N cycles, each cycle of training including a forward translation process of translating the source corpus into a pseudo target corpus and a reverse translation process of translating the pseudo target corpus into a pseudo source corpus and N being a positive integer greater than 1.

In operation 103, a forward translation similarity and a reverse translation similarity are acquired, the forward translation similarity being a similarity between the target corpus and the pseudo target corpus and the reverse translation similarity being a similarity between the source corpus and the pseudo source corpus.

In operation 104, when a sum of the forward translation similarity and the reverse translation similarity converges, it is determined that training of the bidirectional translation model is completed.

In operation 101, the bidirectional translation model to be trained and the training data are acquired. In the method, the forward translation process and the reverse translation process are required to be executed, and thus a machine translation model to be trained adopts the bidirectional translation model. That is, the translation model may be used as a forward translation model and may also be used as a reverse translation model. Herein, the bidirectional translation model may adopt a present common bidirectional translation model in this technical field.

In operation 102, each cycle of training over the bidirectional translation model includes the forward translation process and the reverse translation process. In the forward translation process, the source corpus is an input, and an obtained output is the pseudo target corpus. In the reverse translation process, the pseudo target corpus output by the forward translation process is an input, and an obtained output is the pseudo source corpus.

In operation 103, the forward translation similarity and the reverse translation similarity are acquired. For describing a purpose of acquiring the forward translation similarity and the reverse translation similarity herein, application of similarities in a conventional training method will be explained at first.

In the conventional training method based on a unidirectional translation model, an input end is a source corpus, and an output end is a translation obtained by translation of the model. In such case, the translation obtained by translation of the model is compared with a target corpus corresponding to the source corpus, for example, a similarity between the translation obtained by translation of the model and the target corpus corresponding to the source corpus is calculated. When the similarity is high (for example, converges), it is determined that training of the unidirectional translation model is completed and the unidirectional translation model is optimized.

In the method of the present disclosure, the number of training corpuses is increased by using the corpuses of the reverse translation process, so that a reverse translation model is required to be trained at the same time, namely a forward translation model and the reverse translation model are optimized at the same time. Therefore, the forward translation similarity and the reverse translation similarity, i.e., the similarity between the target corpus and the pseudo target corpus and the similarity between the source corpus and the pseudo source corpus, are required to be acquired.

In operation 104, when it is determined that the sum of the forward translation similarity and the reverse translation similarity converges, it is determined that training of the bidirectional translation model is completed. Herein, converging represents that the sum of the two similarities approaches a value after multiple cycles of training, namely representing that the sum of the two similarities substantially reaches a maximum value.

In the method, adopting the bidirectional translation model for training achieves the purpose of increasing the number of the training corpuses by using the corpuses of the reverse translation process. Moreover, a training process not only includes training of the forward training process but also includes training of the reverse translation process, so that both a forward translation capability and a reverse translation capability are optimized when the model is optimized.

In some embodiments, the operation that the bidirectional translation model is trained for N cycles includes that:

a reconstructor is set in the bidirectional translation model, and the reverse translation process is implemented through the reconstructor.

Herein, the reconstructor is a function model that usually used in the machine translation filed, and may adopt a reconstructor known to those skilled in the art, and thus a specific structure of the reconstructor will not be elaborated.

In the method, with adoption of the reconstructor, the forward translation process and the reverse translation process are implemented at the same time by use of the same machine translation model. That is, under the action of the reconstructor, the source corpus is translated into the pseudo target corpus at first, and then the pseudo target corpus is translated into the pseudo source corpus. Therefore, no matter training of the forward translation process or training of the reverse translation process can achieve the training, i.e., optimization, of the machine translation model.

In some embodiments, the operation that the bidirectional translation model is trained for N cycles includes that:

the pseudo target corpus is acquired through a differentiable sampling function in the forward translation process.

In a conventional machine translation model training method, when a translation result of the source corpus is output, namely during decoding, a word with a maximum probability that may be output as the result (a probability of each word that the source corpus may be translated into may be generated in a translation process) is usually selected by use of an argmax function to obtain the pseudo target corpus. However, in the conventional method, the argmax function in a decoding process is non-differentiable, and consequently, an error generated by translating the source corpus into the pseudo target corpus during reverse translation may not be transferred to the process of translating the pseudo target corpus into the pseudo source corpus. In the method, it may be needed to perform forward translation training and reverse translation training on the translation model at the same time, and this requires the forward translation error to be considered in the reverse translation process.

Therefore, in the method, the differentiable sampling function is adopted instead of the argmax function. The sampling function adopts a differentiable formula instead of a direct maximum probability selection method of the argmax function. The final output result is similar to that obtained by the argmax function, but transfer of the forward translation error to the reverse translation process is implemented.

In some embodiments, the operation that the bidirectional translation model is trained for N cycles further includes that:

an error between the target corpus and the pseudo target corpus is acquired through the differentiable sampling function in the $i^{th}$ cycle of training, i being a positive integer greater than or equal to 1 and less than N; and in the $(i+1)^{th}$ cycle of training, one or more training parameters of the bidirectional translation model are regulated based on the error acquired in the $i^{th}$ cycle of training.

In the model training process, it may be needed to regulate one or more training parameters of the model to continuously optimize the model. In the method, the one or more training parameters of the model may be regulated based on the error between the target corpus and the pseudo target corpus.

In some embodiments, the differentiable sampling function includes a Gumbel-Softmax function.

In the method, the Gumbel-Softmax function is adopted instead of the argmax function. Gumbel-Softmax simulates a distribution of discrete variables and adopts a differentiable formula instead of the direct maximum probability selection method of the argmax function, and it is ensured that a decoding result almost consistent with that obtained by an argmax method is obtained by a differentiable method.

In some embodiments, the operation that the forward translation similarity and the reverse translation similarity are acquired includes that:

a value of a log-likelihood function of the target corpus and the pseudo target corpus and a value of a log-likelihood function of the source corpus and the pseudo source corpus are acquired.

The forward translation similarity may be the value of the log-likelihood function of the target corpus and the pseudo target corpus, and the reverse translation similarity may be the value of the log-likelihood function of the source corpus and the pseudo source corpus. Therefore, a purpose of training the bidirectional translation model is to ensure that a sum of the two values of the log-likelihood functions is substantially maximum, namely converging.

A log-likelihood function may be represented with log-likelihood. If s represents the source corpus, t represents the target corpus, s' represents the pseudo target corpus and t' represents the pseudo target corpus, the value of the log-likelihood function of the target corpus and the pseudo target corpus is represented as log-likelihood (t, t'), and the value of the log-likelihood function of the source corpus and the pseudo source corpus is represented as log-likelihood (s, s').

It is to be noted that the training process for the bidirectional translation model is implemented by use of multiple pieces of training data and the above descriptions are made only with one piece of training data as an example. The same training principle is adopted when the training data is adopted.

In some embodiments, the training data is set with a first language label or a second language label, the training data set with the first language label is the source corpus and the training data set with the second language label is the target corpus, or, the training data set with the second language label is the source corpus and the training data set with the first language label is the target corpus.

Languages of the source corpus and the target corpus are defined for the bidirectional translation model. Therefore, after the training data is set with the language label, the specific input end, to which the training data is input, of the bidirectional translation model may be determined based on the language label.

For example, for translation between Chinese and English, since the bidirectional translation model may implement translation from Chinese to English and may also implement translation from English to Chinese, when the training data includes the source corpus and the target corpus, there are no limits, unlike the unidirectional translation model. Herein, when the bidirectional translation model is trained, Chinese data is taken as the source corpus and English data is taken as the target corpus; or the English data is taken as the source corpus and the Chinese data is taken as the target corpus.

In the method, the source corpus and the target corpus are set in a manner of adding the language label to the data. That is, during training, language labels are added to bilingual parallel corpuses to mark translation directions. For example, Chinese is "你好", English is "hello", and data obtained after labeling is <zh>你好-<en>hello, label <zh> representing a Chinese label and label <en> representing an English label. It may be set by default that the former is the source corpus and the latter is the target corpus.

Therefore, the forward translation process in operation 102 may be implemented based on forward training data from the source corpus to the target corpus and the reverse translation process may be implemented based on reverse training data from the target corpus to the source corpus. Referring to the above example, if the data obtained after labeling is <zh>你好-<en>hello, the forward training data may be 你好—hello, and reverse training data may be hello—你好.

In the manner of adding the language labels to the data, the same data is turned into forward data and reverse data, and both the two pieces of data may be added into a training set for training, so that an effect of enriching the corpuses is also achieved. It can be understood that, for the same purpose of adding the language labels during training, language labels are also required to be added to indicate a target translation language of the translation model when the bidirectional translation model is decoded.

Figure 2:
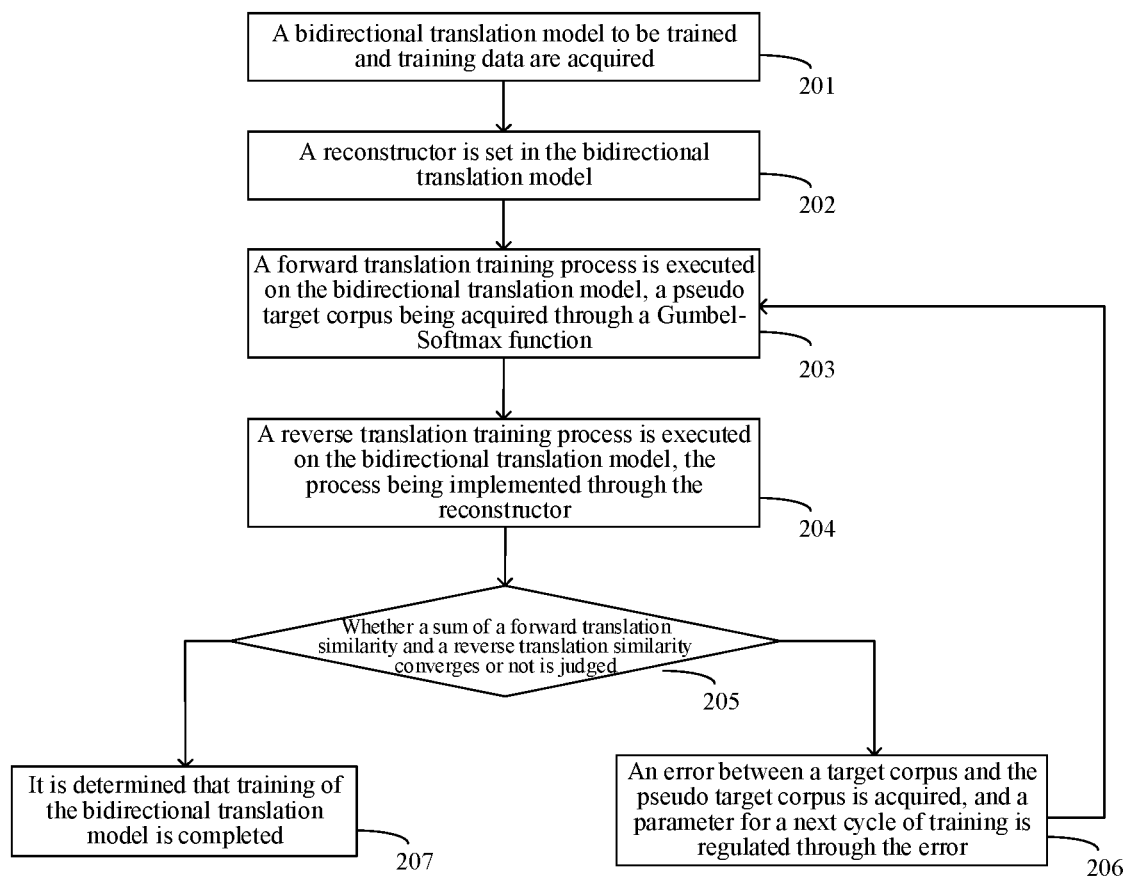
FIG. 2 is a flowchart showing a method for training a machine translation model according to some embodiments of the present disclosure.

As shown in FIG. 2, a specific embodiment according to some embodiments of the present disclosure is shown. In the embodiment, a bidirectional translation model is a neural machine translation model. The method of the embodiment includes the following operations.

In operation 201, a bidirectional translation model to be trained and training data are acquired, the training data including a source corpus and a target corpus corresponding to the source corpus.

In operation 202, a reconstructor is set in the bidirectional translation model.

In operation 203, a forward translation training process is executed on the bidirectional translation model, a pseudo target corpus being acquired through a Gumbel-Softmax function in the forward translation process.

In operation 204, a reverse translation training process is executed on the bidirectional translation model, the process being implemented through the reconstructor.

In operation 205, a forward translation similarity and a reverse translation similarity are acquired, and whether a sum of the forward translation similarity and the reverse translation similarity converges or not is judged.

In operation 206, when the sum of the forward translation similarity and the reverse translation similarity does not converge, an error between a target corpus and the pseudo target corpus is acquired through the Gumbel-Softmax function, one or more parameters for a next cycle of training are regulated through the error, and operation 203 is re-executed to continue the next cycle of training.

In operation 207, when the sum of the forward translation similarity and the reverse translation similarity converges, it is determined that training of the bidirectional translation model is completed.

Figure 3:
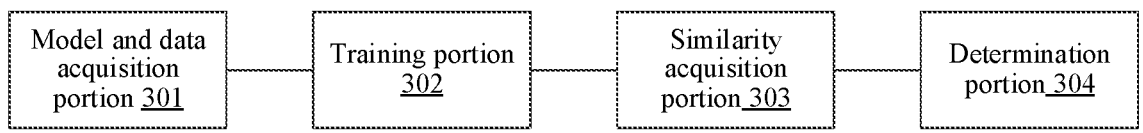
FIG. 3 is a block diagram of a method for training a machine translation model according to some embodiments of the present disclosure.

FIG. 3 is a block diagram of a device for training a machine translation model, according to some embodiments of the present disclosure. As shown in FIG. 3, the device includes:

a model and data acquisition portion 301, configured to acquire a bidirectional translation model to be trained and training data, the training data including a source corpus and a target corpus corresponding to the source corpus;

a training portion 302, configured to train the bidirectional translation model for N cycles, each cycle of training including a forward translation process of translating the source corpus into a pseudo target corpus and a reverse translation process of translating the pseudo target corpus into a pseudo source corpus and N being a positive integer greater than 1;

a similarity acquisition portion 303, configured to acquire a forward translation similarity and a reverse translation similarity, the forward translation similarity being a similarity between the target corpus and the phony target corpus and the reverse translation similarity being a similarity between the source corpus and the phony source corpus; and a determination portion 304, configured to, when a sum of the forward translation similarity and the reverse translation similarity converges, determine that training of the bidirectional translation model is completed.

In some embodiments, the training portion 302 further includes a reconstructor, and the reverse translation process is implemented through the reconstructor.

In some embodiments, the training portion 302 is further configured to:

acquire the pseudo target corpus through a differentiable sampling function in the forward translation process.

In some embodiments, the training portion 302 is further configured to:

acquire an error between the target corpus and the pseudo target corpus through the differentiable sampling function in the $i^{th}$ cycle of training, i being a positive integer greater than or equal to 1 and less than N; and regulate a training parameter of the bidirectional translation model based on the error acquired in the $i^{th}$ cycle of training in the $(i+1)^{th}$ cycle of training.

In some embodiments, the differentiable sampling function includes a Gumbel-Softmax function.

In some embodiments, the similarity acquisition portion 303 is further configured to:

acquire a value of a log-likelihood function of the target corpus and the pseudo target corpus and a value of a log-likelihood function of the source corpus and the pseudo source corpus.

In some embodiments, the model and data acquisition portion is further configured to:

set a first language label or a second language label for the training data, the training data set with the first language label is the source corpus and the training data set with the second language label is the target corpus, or, the training data set with the second language label is the source corpus and the training data set with the first language label is the target corpus.

With respect to the device in the above embodiment, the specific manners for performing operations for individual portions therein have been described in detail in the embodiments regarding the method, which will not be elaborated herein.

In the present disclosure, the bidirectional translation model is taken as the machine translation model in the present disclosure. In each cycle of training, the forward translation process of translating the source corpus into the pseudo target corpus and the reverse translation process of translating the pseudo target corpus into the pseudo source corpus are implemented, and whether the sum of the forward translation similarity of the forward translation process and the reverse translation similarity of the reverse translation process converges or not is judged to determine whether training of the machine translation model is completed or not. The reverse translation process is implemented through the reconstructor.

With adoption of the method, a reverse translation corpus is introduced into training to enriching corpuses, so that a model training effect is improved under the condition of few resources. Moreover, with introduction of a bidirectional translation method, a reverse translation model is trained at the same time, so that the problem that it is difficult to acquire a high-quality reverse translation model by use of a conventional reverse translation method is solved.

Figure 4:
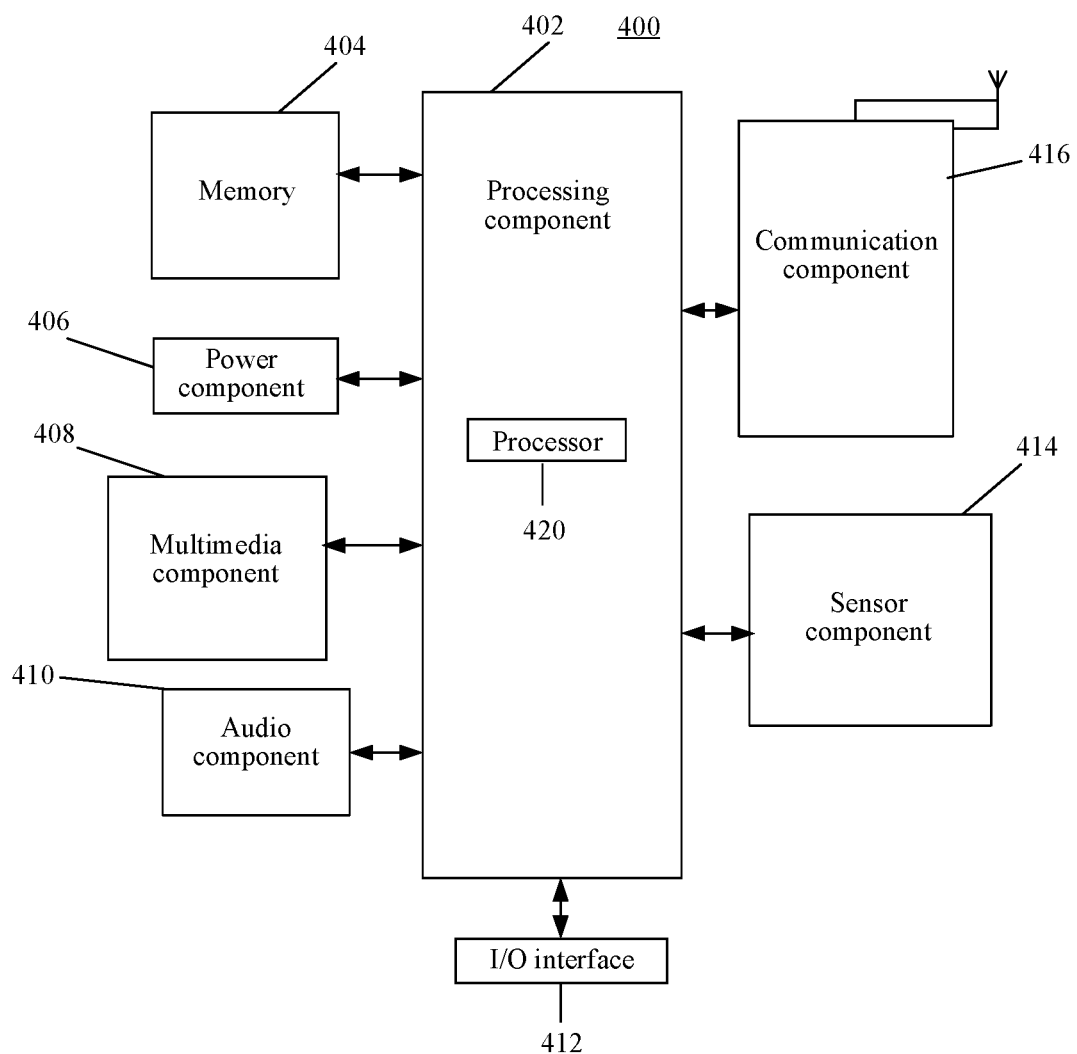
FIG. 4 is a block diagram of a device according to some embodiments of the present disclosure.

FIG. 4 is a block diagram of a device 400 for training a machine translation model, according to some embodiments of the present disclosure. For example, the device 400 may be a mobile phone, a computer, a digital broadcast terminal, a messaging device, a gaming console, a tablet, a medical device, exercise equipment, a personal digital assistant and the like.

Referring to FIG. 4, the device 400 may include one or more of the following components: a processing component 402 such as one or more processing circuits, a memory device 404, a power component 406, a multimedia component 408, an audio component 410, an Input/Output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the operations in the abovementioned method. Moreover, the processing component 402 may include one or more modules which facilitate interaction between the processing component 402 and the other components. For instance, the processing component 402 may include a multimedia module to facilitate interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 406 provides power for various components of the device 400. The power component 406 may include a power management system, one or more power supplies, and other components associated with generation, management and distribution of power for the device 400.

The multimedia component 408 includes a screen providing an output interface between the device 400 and a user. In some embodiments, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action.

The multimedia component 408 can output translation results to a user, for example in a form of textual content displayed on the screen.

In some embodiments, the multimedia component 408 includes a front camera and/or a rear camera. The front camera and/or the rear camera may receive external multimedia data when the device 400 is in an operation mode, such as a photographing mode or a video mode. Each of the front camera and the rear camera may be a fixed optical lens system or have focusing and optical zooming capabilities.

The camera can capture content to be translated, as directed by the user.

The audio component 410 is configured to output and/or input an audio signal. For example, the audio component 410 includes a Microphone (MIC), and the MIC is configured to receive an external audio signal when the device 400 is in the operation mode, such as a call mode, a recording mode and a voice recognition mode. The received audio signal may further be stored in the memory 404 or sent through the communication component 416. In some embodiments, the audio component 410 further includes a speaker configured to output the audio signal.

The audio component 410 can output translation results to a user, for example in a form of synthesized voice.

The I/O interface 412 provides an interface between the processing component 402 and a peripheral interface module, and the peripheral interface module may be a keyboard, a click wheel, a button and the like. The button may include, but not limited to: a home button, a volume button, a starting button and a locking button.

The sensor component 414 includes one or more sensors configured to provide status assessment in various aspects for the device 400. For instance, the sensor component 414 may detect an on/off status of the device 400 and relative positioning of components, such as a display and small keyboard of the device 400, and the sensor component 414 may further detect a change in a position of the device 400 or a component of the device 400, presence or absence of contact between the user and the device 400, orientation or acceleration/deceleration of the device 400 and a change in temperature of the device 400. The sensor component 414 may include a proximity sensor configured to detect presence of an object nearby without any physical contact. The sensor component 414 may also include a light sensor, such as a Complementary Metal Oxide Semiconductor (CMOS) or Charge Coupled Device (CCD) image sensor, configured for use in an imaging application. In some embodiments, the sensor component 414 may also include an acceleration sensor, a gyroscope sensor, a magnetic sensor, a pressure sensor or a temperature sensor.

The communication component 416 is configured to facilitate wired or wireless communication between the device 400 and another device. The device 400 may access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments, the communication component 416 receives a broadcast signal or broadcast associated information from an external broadcast management system through a broadcast channel. In some embodiments, the communication component 416 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In some embodiments, the device 400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In addition, for example, the one or more processors 420 may be configured to execute the instructions to execute the method: a bidirectional translation model to be trained and training data are acquired, the training data including a source corpus and a target corpus corresponding to the source corpus; the bidirectional translation model is trained for N cycles, each cycle of training including a forward translation process of translating the source corpus into a pseudo target corpus and a reverse translation process of translating the pseudo target corpus into a pseudo source corpus and N being a positive integer greater than 1; a forward translation similarity and a reverse translation similarity are acquired, the forward translation similarity being a similarity between the target corpus and the pseudo target corpus and the reverse translation similarity being a similarity between the source corpus and the pseudo source corpus; and when a sum of the forward translation similarity and the reverse translation similarity converges, it is determined that training of the bidirectional translation model is completed.

When it is determined that training of the bidirectional translation model is completed, the training completed bidirectional translation model may be used to perform translation between the language of the source corpus and the language of the target corpus. For example, if a user desires to translate one or more sentences or words of the language of the source corpus into the language of the target corpus, the user may firstly input the to-be-translated sentences or words in the language the source corpus into the device 400 through the I/O interface 412 or the sensor component 414. The one or more processors 420 may acquire the to-be-translated sentences or word from the I/O interface 412 or the sensor component 414, and input the acquired to-be-translated sentences or words into the training completed bidirectional translation model. Then, the to-be-translated sentences or words may be translated into the language of the target corpus by using the training completed bidirectional translation model. After translation, the one or more processors 420 may acquire the sentences or words of the language of the target corpus, which may be output by the training completed bidirectional translation model. The sentences or words of the language of the target corpus may be feedback to the user through the I/O interface 412 or the sensor component 414.

In some embodiments, there is also provided a non-transitory computer-readable storage medium including instructions, such as the memory 404 including instructions, and the instructions may be executed by the processor 420 of the device 400 to implement the abovementioned method. For example, the non-transitory computer-readable storage medium may be a ROM, a Compact Disc Read-Only Memory (CD-ROM), a magnetic tape, a floppy disc, an optical data storage device and the like.

Instructions in the storage medium can be executed by one or more processors of a terminal to enable the terminal to execute a method for training a machine translation model, the method including that: a bidirectional translation model to be trained and training data are acquired, the training data including a source corpus and a target corpus corresponding to the source corpus; the bidirectional translation model is trained for N cycles, each cycle of training including a forward translation process of translating the source corpus into a pseudo target corpus and a reverse translation process of translating the pseudo target corpus into a pseudo source corpus and N being a positive integer greater than 1; a forward translation similarity and a reverse translation similarity are acquired, the forward translation similarity being a similarity between the target corpus and the pseudo target corpus and the reverse translation similarity being a similarity between the source corpus and the pseudo source corpus; and when a sum of the forward translation similarity and the reverse translation similarity converges, it is determined that training of the bidirectional translation model is completed.

Figure 5:
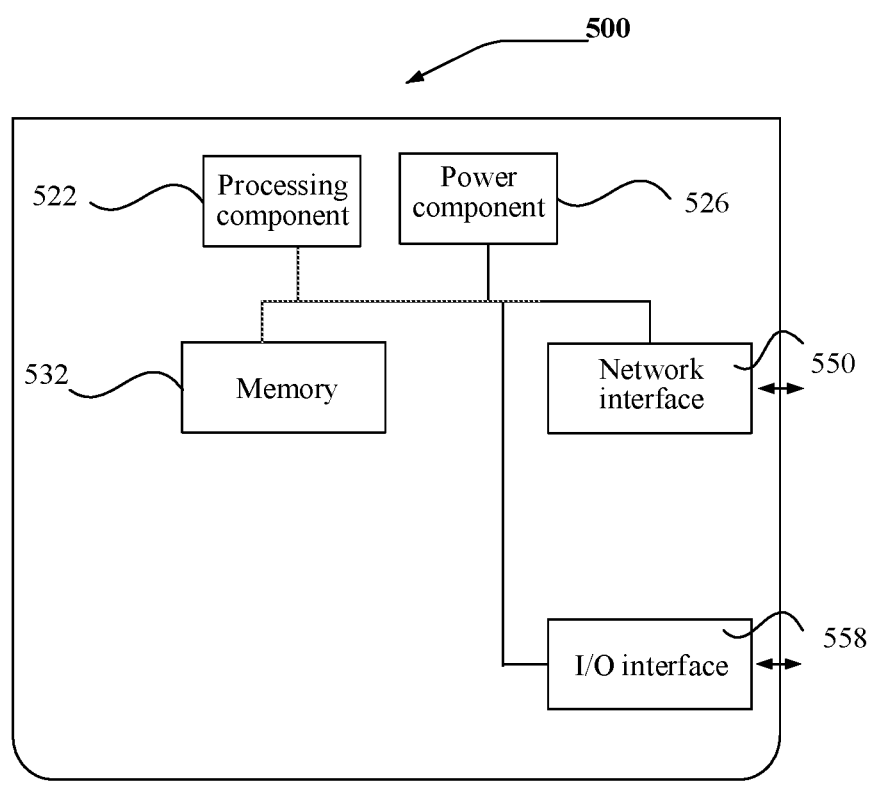
FIG. 5 is a block diagram of a device according to some embodiments of the present disclosure.

FIG. 5 is a block diagram of a device 500 for training a machine translation model, according to some embodiments of the present disclosure. For example, the device 500 may be provided as a server.

Referring to FIG. 5, the device 500 includes a processing component 522, further including one or more processors or processing circuits, and a memory resource represented by memory device 532, configured to store instructions executable for the processing component 522, for example, an application program. The application program stored in the memory 532 may include one or more than one module of which each corresponds to a set of instructions. In addition, the processing component 522 is configured to execute the instructions to execute the method: a bidirectional translation model to be trained and training data are acquired, the training data including a source corpus and a target corpus corresponding to the source corpus; the bidirectional translation model is trained for N cycles, each cycle of training including a forward translation process of translating the source corpus into a pseudo target corpus and a reverse translation process of translating the pseudo target corpus into a pseudo source corpus and N being a positive integer greater than 1; a forward translation similarity and a reverse translation similarity are acquired, the forward translation similarity being a similarity between the target corpus and the pseudo target corpus and the reverse translation similarity being a similarity between the source corpus and the pseudo source corpus; and when a sum of the forward translation similarity and the reverse translation similarity converges, it is determined that training of the bidirectional translation model is completed.

The device 500 may further include a power component 526 configured to execute power management of the device 500, a wired or wireless network interface 550 configured to connect the device 500 to a network and an I/O interface 558. The device 500 may be operated based on an operating system stored in the memory 532, for example, Windows Server™, Mac OS X™, Unix™, Linux™, FreeBSD™ or the like.

When it is determined that training of the bidirectional translation model is completed, the training completed bidirectional translation model may be used to perform translation between the language of the source corpus and the language of the target corpus. For example, if a user desires to translate one or more sentences or words of the language the source corpus into the language of the target corpus. The user may firstly input the to-be-translated sentences or words in the language the source corpus into his/her terminal (which may be a mobile phone, a computer, a digital broadcast terminal, a messaging device, a gaming console, a tablet, a medical device, exercise equipment, a personal digital assistant and the like). The terminal may transmit the to-be-translated sentences or words to the device 500 (which is provided as a server) through internet. The processing component 522 of the device 500 may acquire, through the wired or wireless network interface 550, the to-be-translated sentences or words, and input the acquired to-be-translated sentences or words into the training completed bidirectional translation model. Then, the to-be-translated sentences or words may be translated into the language of the target corpus by using the training completed bidirectional translation model. After translation, the processing component 522 may acquire the sentences or words of the language of the target corpus, which may be output by the training completed bidirectional translation model. The sentences or words of the language of the target corpus may be feedback to the terminal of the user through the wired or wireless network interface 550. Finally, the user may acquire the sentences or words of the language of the target corpus by his/her terminal.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for training a machine translation model, comprising:
   acquiring a bidirectional translation model to be trained and training data, the training data comprising a source corpus and a target corpus corresponding to the source corpus;
   training the bidirectional translation model for N cycles, each cycle of training comprising a forward translation process of translating the source corpus into a pseudo target corpus by the machine translation model and a reverse translation process of translating the pseudo target corpus into a pseudo source corpus by the machine translation model, and N being a positive integer greater than 1;
   acquiring a forward translation similarity and a reverse translation similarity, the forward translation similarity being a similarity between the target corpus and the pseudo target corpus, and the reverse translation similarity being a similarity between the source corpus and the pseudo source corpus; and
   when a sum of the forward translation similarity and the reverse translation similarity converges, determining that training of the bidirectional translation model is completed, wherein the sum of the forward translation similarity and the reverse translation similarity converges indicates the sum of the forward translation similarity and the reverse translation similarity approaches a value,
   wherein the training the bidirectional translation model for N cycles comprises:
   acquiring, in the forward translation process, the pseudo target corpus through a differentiable sampling function;
   acquiring, in an ith cycle of training, an error between the target corpus and the pseudo target corpus through the differentiable sampling function, i being a positive integer greater than or equal to 1 and less than N; and
   regulating, in the (i+1)th cycle of training, one or more training parameters of the bidirectional translation model based on the error acquired in the ith cycle of training.

2. The method of claim 1, wherein training the bidirectional translation model for N cycles further comprises:
   setting a reconstructor in the bidirectional translation model; and
   implementing the reverse translation process through the reconstructor.

3. The method of claim 1, wherein the differentiable sampling function comprises a Gumbel-Softmax function.

4. The method of claim 1, wherein the acquiring the forward translation similarity and the reverse translation similarity comprises:
   acquiring a value of a log-likelihood function of the target corpus and the pseudo target corpus, and a value of a log-likelihood function of the source corpus and the pseudo source corpus.

5. The method of claim 1, wherein the training data is set with a first language label or a second language label, the training data set with the first language label is the source corpus and the training data set with the second language label is the target corpus, or, the training data set with the second language label is the source corpus and the training data set with the first language label is the target corpus.

6. A machine translation system implementing the method of claim 1, comprising one or more processing circuits configured to implement operations of the method, and at least one of a display screen and an audio component configured to output a translation result; wherein:
   the reverse translation corpus is introduced into training to enrich corpuses, such that a model training efficiency is improved under condition of few resources for a minority language; and
   with introduction of the bidirectional translation method, the reverse translation model is trained at the same time, to thereby improve quality of the reverse translation model.

7. A device for training a machine translation model, comprising:
   a processor; and
   memory storing instructions executable by the processor, wherein when the instructions are executed by the processor, the processor is configured to:
   acquire a bidirectional translation model to be trained and training data, the training data comprising a source corpus and a target corpus corresponding to the source corpus;
   train the bidirectional translation model for N cycles, each cycle of training comprising a forward translation process of translating the source corpus into a pseudo target corpus by the machine translation model and a reverse translation process of translating the pseudo target corpus into a pseudo source corpus by the machine translation model and N being a positive integer greater than 1;
   acquire a forward translation similarity and a reverse translation similarity, the forward translation similarity being a similarity between the target corpus and the pseudo target corpus and the reverse translation similarity being a similarity between the source corpus and the pseudo source corpus; and
   when a sum of the forward translation similarity and the reverse translation similarity converges, determine that training of the bidirectional translation model is completed, wherein the sum of the forward translation similarity and the reverse translation similarity converges indicates the sum of the forward translation similarity and the reverse translation similarity approaches a value, wherein the processor is further configured to:

acquire, in the forward translation process, the pseudo target corpus through a differentiable sampling function;

acquire, in an ith cycle of training, an error between the target corpus and the pseudo target corpus through the differentiable sampling function, i being a positive integer greater than or equal to 1 and less than N; and regulate, in the (i+1)th cycle of training, one or more training parameters of the bidirectional translation model based on the error acquired in the ith cycle of training.

8. The device of claim 7, wherein the processor is further configured to set a reconstructor in the bidirectional translation model, and the reverse translation process is implemented through the reconstructor.

9. The device of claim 7, wherein the differentiable sampling function comprises a Gumbel-Softmax function.

10. The device of claim 7, wherein the processor is further configured to:

acquire a value of a log-likelihood function of the target corpus and the pseudo target corpus and a value of a log-likelihood function of the source corpus and the pseudo source corpus.

11. The device of claim 7, wherein the processor is further configured to:

set a first language label or a second language label for the training data, the training data set with the first language label is the source corpus and the training data set with the second language label is the target corpus, or, the training data set with the second language label is the source corpus and the training data set with the first language label is the target corpus.

12. A non-transitory computer-readable storage medium having instructions stored therein for execution by one or more processors of a terminal to enable the terminal to execute a method for training machine translation model, the method comprising:

acquiring a bidirectional translation model to be trained and training data, the training data comprising a source corpus and a target corpus corresponding to the source corpus;

training the bidirectional translation model for N cycles, each cycle of training comprising a forward translation process of translating the source corpus into a pseudo target corpus by the machine translation model and a reverse translation process of translating the pseudo target corpus into a pseudo source corpus by the machine translation model and N being a positive integer greater than 1;

acquiring a forward translation similarity and a reverse translation similarity, the forward translation similarity being a similarity between the target corpus and the pseudo target corpus and the reverse translation similarity being a similarity between the source corpus and the pseudo source corpus; and when a sum of the forward translation similarity and the reverse translation similarity converges, determining that training of the bidirectional translation model is completed, wherein the sum of the forward translation similarity and the reverse translation similarity converges indicates the sum of the forward translation similarity and the reverse translation similarity approaches a value, wherein the training the bidirectional translation model for N cycles further comprises:

acquiring, in the forward translation process, the pseudo target corpus through a differentiable sampling function;

acquiring, in an ith cycle of training, an error between the target corpus and the pseudo target corpus through the differentiable sampling function, i being a positive integer greater than or equal to 1 and less than N; and regulating, in the (i+1)th cycle of training, one or more training parameters of the bidirectional translation model based on the error acquired in the ith cycle of training.

13. The non-transitory computer-readable storage medium of claim 12, wherein the training the bidirectional translation model for N cycles comprises:

setting a reconstructor in the bidirectional translation model; and implementing the reverse translation process through the reconstructor.

14. The non-transitory computer-readable storage medium of claim 13, wherein the differentiable sampling function comprises a Gumbel-Softmax function.

15. The non-transitory computer-readable storage medium of claim 12, wherein the acquiring the forward translation similarity and the reverse translation similarity comprises:

acquiring a value of a log-likelihood function of the target corpus and the pseudo target corpus and a value of a log-likelihood function of the source corpus and the pseudo source corpus.

* * * * *